A. FAITELOWITZ.
MILK TESTING APPARATUS.
APPLICATION FILED MAR. 8, 1912.
1,059,289.
Patented Apr. 15, 1913.
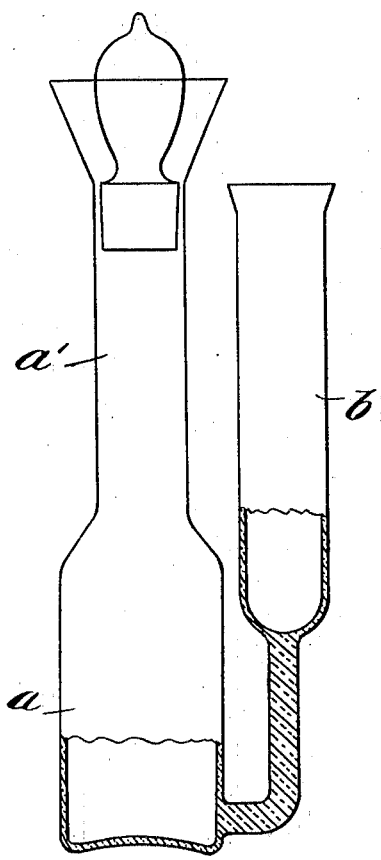

UNITED STATES PATENT OFFICE.

ARNOLD FAITELOWITZ, OF HALENSEE, NEAR BERLIN, GERMANY.

MILK-TESTING APPARATUS.

1,059,289.  Specification of Letters Patent.  Patented Apr. 15, 1913.

Application filed March 8, 1912.  Serial No. 682,404.

*To all whom it may concern:*

Be it known that I, ARNOLD FAITELOWITZ, a subject of the Czar of Russia, and residing at Halensee, near Berlin, Germany, have invented certain new and useful Improvements in Milk-Testing Apparatus, of which the following is a specification.

My invention relates to milk-testing apparatus particularly adapted for determining the freshness and purity of origin of milk, a dilute methylene blue solution being used. As is well-known, the time required by a sample of milk which has been mixed with methylene blue to become colorless is measured with the aid of the apparatus.

According to my process I work with a sample of milk which is only slightly colored with methylene blue and determine the time which such a sample requires to become completely colorless, whereby a conclusion can be drawn as to the freshness of the milk. In order to be able exactly to determine the moment when the milk becomes colorless flasks having a small vertical test-tube fused on to the side have been known heretofore. A sample of the milk to be tested is put in its uncolored state into this small test-tube, while the milk mixed with methylene blue is poured into the flask itself. The two liquids whose colors are to be compared are then beside one another, in order to determine the moment of the return of the colored milk to the color of the uncolored milk. This known apparatus has, however, certain defects. Firstly, it is difficult correctly to compare the color of the layer of milk of small diameter in the small tube with the layer of milk of larger diameter in the flask. If the milk in the side tube be compared with the layer of milk of approximately equal diameter in the neck of the flask incorrect results are obtained because the cream of the milk in the flask rises into the upper part of the neck of the flask, and just this cream possesses a considerable influence on the disappearance of the color of the methylene blue solution. The color of the methylene blue solution first disappears in the cream.

A primary object of my invention is to provide improved apparatus of the type described for testing milk, to which these defects are not attached. To this end, I make the neck of the milk flask both materially longer than heretofore and of a diameter equal to that of the small side tube.

One illustrative embodiment of my invention is represented by way of example in part sectional elevation in the accompanying drawing.

Referring to the drawing, my improved apparatus comprises a milk flask $a$ having a long neck $a'$ of a diameter substantially equal to that of the tube $b$ attached to the side of the flask, the said tube having no communication, however, with said flask.

The size of the flask containing the colored milk is of course selected so small that the cream rising out of this quantity of milk can fill only a very small portion of the long tubular neck of the flask. It has been found that it is preferable to select the size of the neck relatively to the size of the remainder of the flask so that the neck can contain more than $\frac{1}{5}$ of the total cubic contents of the remainder of the flask. In this manner it is possible to obviate the above-mentioned defects and always to compare two layers of milk having approximately the same diameter and approximately the same percentage of fat.

I claim:—

1. An apparatus for testing milk by the methylene blue process comprising, in combination, a flask having an elongated tubular neck whose volumetric capacity is equal to a considerable fraction of that of the body of the flask, and a vertical test-tube of substantially the same diameter as said neck secured to said flask but devoid of communication with the same, said test-tube being disposed by the side of said neck.

2. An apparatus for testing milk by the methylene blue process comprising, in combination, a flask having an elongated tubular neck whose volumetric capacity is more than one-fifth that of the body of the flask, and a vertical test-tube of substantially the same diameter as said neck secured to said flask but devoid of communication with the same, said test-tube being disposed by the side of said neck.

In testimony whereof I have hereunto set my hand in presence of two subscribing witnesses.

ARNOLD FAITELOWITZ.

Witnesses:
 WOLDEMAR HAUPT,
 HENRY HASPER.

Copies of this patent may be obtained for five cents each, by addressing the "Commissioner of Patents, Washington, D. C."